United States Patent [19]

Hustak, Jr. et al.

[11] Patent Number: 5,104,284

[45] Date of Patent: Apr. 14, 1992

[54] THRUST COMPENSATING APPARATUS

[75] Inventors: Jerome F. Hustak, Jr.; David J. Peer, both of Olean, N.Y.

[73] Assignee: Dresser-Rand Company, Corning, N.Y.

[21] Appl. No.: 628,445

[22] Filed: Dec. 17, 1990

[51] Int. Cl.⁵ ............................ F01D 3/00; F01D 3/04
[52] U.S. Cl. .................................... 415/105; 415/104; 415/107; 277/27; 310/90.5
[58] Field of Search ................. 415/105, 107, 14, 87, 415/48, 104, 110, 111; 310/90.5; 277/27, 28, DIG. 8

[56] References Cited

U.S. PATENT DOCUMENTS

| | | | |
|---|---|---|---|
| 2,304,994 | 12/1942 | Franck | 415/107 |
| 3,531,223 | 9/1970 | Daltry et al. | 415/105 |
| 3,563,618 | 2/1971 | Ivanov | 415/104 |
| 3,671,137 | 6/1972 | Ball | 415/104 |
| 4,170,435 | 10/1979 | Swearingen | 415/104 |
| 4,413,946 | 11/1983 | Marshall et al. | 415/28 |
| 4,472,107 | 9/1984 | Chang et al. | 415/104 |
| 4,538,960 | 9/1985 | Iino et al. | 415/104 |
| 4,615,657 | 10/1986 | Kreitmeier | 415/107 |
| 4,822,240 | 4/1989 | Marshall | 277/27 |
| 4,892,459 | 1/1990 | Guelich | 415/104 |
| 4,993,917 | 2/1991 | Kulle et al. | 415/107 |

FOREIGN PATENT DOCUMENTS

| | | | |
|---|---|---|---|
| 0344503 | 12/1989 | European Pat. Off. | 310/90.5 |
| 0150620 | 11/1981 | Japan | 310/90.5 |
| 0469815 | 8/1975 | U.S.S.R. | 415/107 |

Primary Examiner—Thomas E. Denion
Attorney, Agent, or Firm—Richards, Medlock & Andrews

[57] ABSTRACT

Thrust compensating apparatus for providing a thrust force to compensate for the thrust forces applied to the shaft of single stage overhung turbo machines by the fluid pressure in the cavity of the turbo machine is disclosed and includes a thrust compensating member attached to the shaft of the turbo machine and having a first surface subjected to the fluid pressure in the cavity, an annular seal, an annulus cavity formed by a second surface of the thrust compensating member and the annular seal and venting apparatus for controlling the fluid pressure in the annulus cavity resulting in a compensating thrust force being applied to the thrust compensating member as a result of the differential in pressure across the first and second surfaces of the thrust compensating member.

13 Claims, 3 Drawing Sheets

THRUST COMPENSATING APPARATUS

BACKGROUND OF THE INVENTION

This invention relates generally to turbo machinery and the like which is subject to high thrust forces which are created by unbalanced seal areas. More particularly, but not by way of limitation, this invention relates to thrust compensation apparatus for turbo machinery which utilizes magnetic bearings by providing thrust forces on the shaft to counteract the shaft thrust created by the case pressure.

In a single stage pipeline compressor, one end of the shaft is exposed to the full case pressure while the other end of the shaft is outside the pressure enclosure. This creates a very high thrust load on the shaft whenever the case is pressurized. In attempting to provide magnetic bearings to this type of compressor, two problems were found. The first problem is concerned with the load rating of magnetic bearings. Because of the limitations of the magnetic properties of available materials, magnetic bearings are limited to unit loads of 65 lb/sq. in. Thus, a 100 square inch magnetic bearing will handle up to 6500 lbs. of thrust. By comparison, an oil film bearing of the same size can accommodate 50,000 lb. on a continuous basis and up to 50% more for instantaneous conditions. For single stage units of this type, the thrust load at start up demands a magnetic thrust bearing which is so large, it is physically impractical, if not physically impossible to accommodate it. The second problem is concerned with the control of the shaft position. If the mass of the rotor is small in relation to the thrust bearing size, the inertia of the rotor will not be large enough to overcome the instantaneous corrections to the shaft position. Thus, the rotor will be overly sensitive to the control system and the proper shaft position cannot be maintained. Single stage compressor rotors tend to be very light in relation to the thrust load.

In order to utilize a magnetic thrust bearing in a single stage overhung compressor, it is necessary to develop a method of overcoming these two problems. Through the use of our invention, it is possible to reduce the high thrust load which exists at start up. The invention also makes use of some of the magnetic bearing features which are unavailable with oil film bearings. The inventive device is located in the central portion of the shaft where the bearings can better control the shaft movement. No external source of high pressure gas or fluid is required.

SUMMARY OF THE INVENTION

This invention provides thrust compensating apparatus for turbo machinery or the like having a housing, a rotor shaft, a cavity in the housing encircling the rotor shaft, means for applying fluid pressure in the cavity, bearings in the housing supporting the rotor shaft and including a magnetic axial thrust bearing and sensor operatively connected to a control system. The thrust compensating apparatus comprises an annular thrust compensating member mounted to the rotor shaft and having a first radially oriented face subjected to the fluid pressure in the cavity in the housing.

An annular seal is located in the housing and is structured for rotatingly and sealingly receiving the annular thrust compensating member. A first annulus cavity is formed by the annular thrust compensating member and the annular seal. Vent means are provided for controlling the fluid pressure in the first annulus cavity, thereby controlling the resulting thrust force applied to the first radially oriented face of the annular thrust compensating member.

BRIEF DESCRIPTION OF THE DRAWINGS

Other advantages and features of the invention will become more apparent with reference to the following detailed description of a presently preferred embodiment thereof in connection with the accompanying drawings, wherein like reference numerals have been applied to like elements, in which.

DETAILED DESCRIPTION

Figure 1:
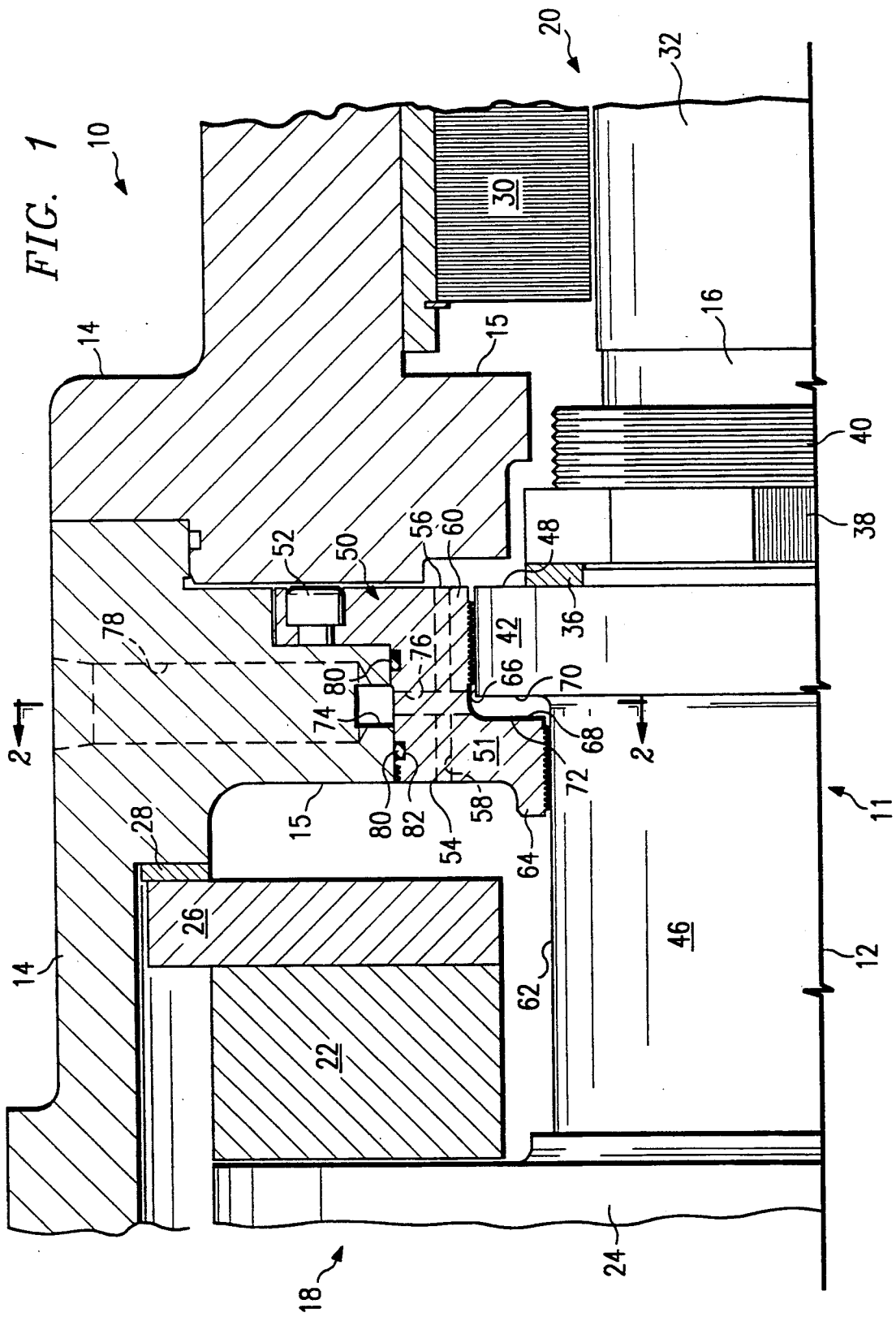
FIGURE 1 is a partial, cross-sectional view of the turbo machine including thrust compensating apparatus that is constructed in accordance with the invention.

Referring to the drawing and FIG. 1 in particular, shown therein and generally designated by the reference character 10 is a turbo machine incorporating thrust compensating apparatus 11 that is constructed in accordance with the invention. The turbo machine 10 includes a housing 14 having magnetic bearings 18, 20 and 84 (see FIG. 3) that journal a shaft 16. Magnetic bearings 20 and 84 are magnetic radial bearings while magnetic bearing 18 is a magnetic axial thrust bearing. Housing 14 is hollow having a cavity 15 that is in communication with the high pressure process gas introduced to the turbo machine 10 through the inlet (not shown) thereof.

Thrust compensating member 12 includes a bore 17 for removably mounting thrust compensating member 12 to shaft 16 by conventional means including washer 36, nut 38 and threaded cap 40. Thrust compensating member 12 comprises a first portion 42 having a first predetermined diameter and a second portion 46 having a second predetermined diameter which is less than the first predetermined diameter. First radially oriented face 48 is exposed to the high pressure gas in cavity 15.

Annular seal 50 is mounted in housing 14 by conventional fastening means 52 and includes a seal body 51 having a first end 54 and a second end 56. A first plurality of passageways 58 extend through the first end 54 and the second end 56 to equalize the pressure on the ends. Annular seal 50 includes a first radially-projecting annular flange 60 for rotatingly and sealingly receiving the outer periphery 66 of the first portion 42 of thrust compensating member 12. Annular seal 50 also includes a second radially-projecting annular flange 64 for rotatingly and sealingly receiving the outer periphery 62 of second portion 46 of thrust compensating member 12. First radially-projecting annular flange 60 and second radially-projecting annular flange 64 are separated axially a predetermined distance to form a first annular cavity 68 with the second radially oriented face 70 of first portion 42 of thrust compensating member 12. Housing 14 is further provided with grooves 82 that generally encircle bore 17. Resilient toroidal members 80, which are preferably O-rings, are placed in grooves 82.

Second annular cavity 74 is formed in housing 14 and is in communication with first annular cavity 68 via a second plurality of passageways 76. Fluid conduit means 78 extends from the second annulus cavity 74 through the outer periphery of the housing 14. Further connection to fluid conduit means 78 will be discussed with reference to FIG. 3. Magnetic axial thrust bearing 18 comprises a stator 22 and a rotor or disk 24. Stator 22 is mounted to housing 14 by conventional means such as support ring 26 and spacer 28. Rotor or disk 24 is mounted to rotor shaft 16 for rotation therewith. Outboard magnetic radial bearing 20 comprises stator 30 and rotor sleeve 32. Stator 30 is mounted to housing 14 by conventional means while rotor sleeve 32 is mounted to rotor shaft 16 for rotation therewith.

Figure 2:
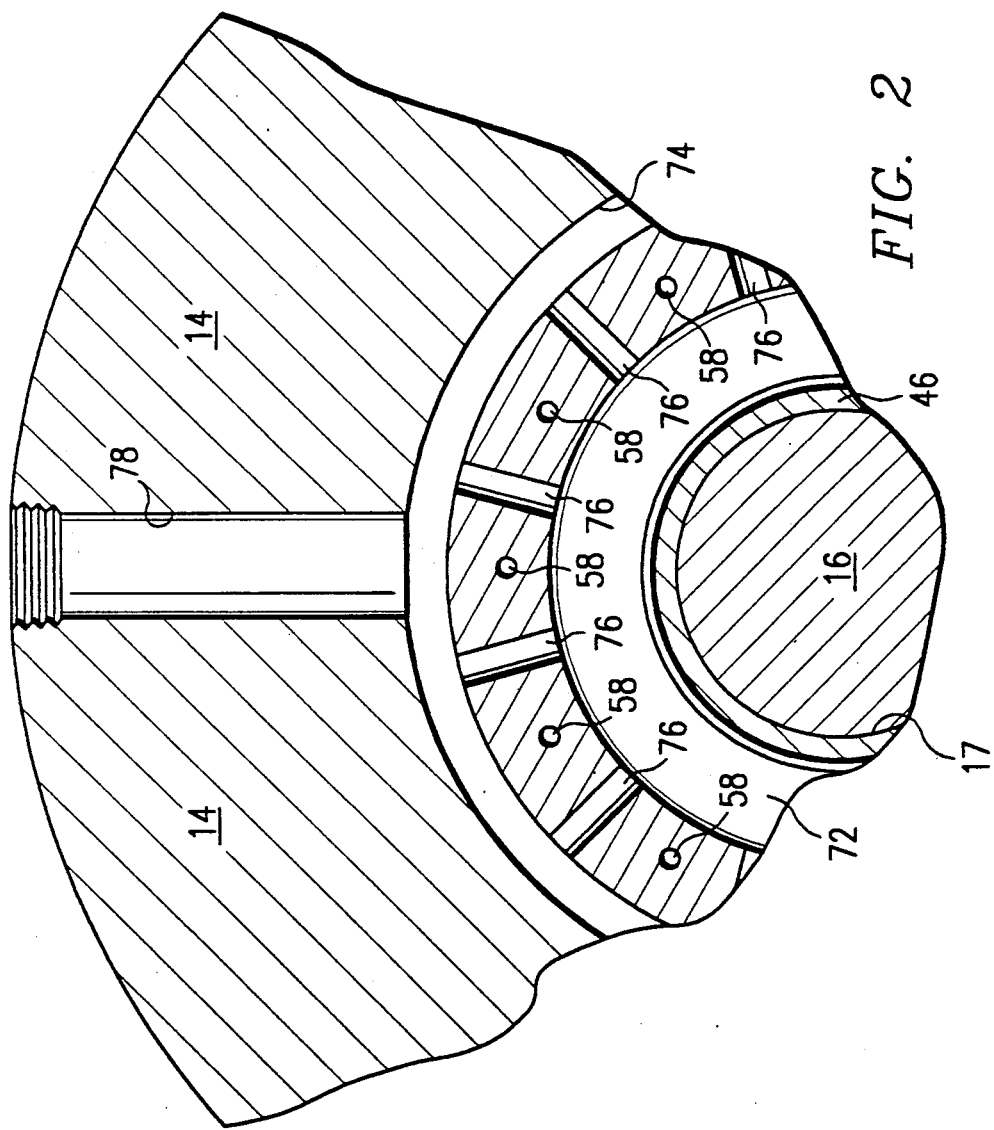
FIG. 2 is a cross-sectional view taken generally along the line 2—2 of FIG. 1.

The cross section of FIG. 2, which is taken along the line 2—2 of FIG. 1, further illustrates the structural details of the thrust compensating apparatus 11. Second portion 46 of thrust compensating member 12 is shown in mounted relationship with shaft 16. First radially oriented face 72 of annular seal 50 is positioned radially outwardly from second portion 46 and forms one portion of first annulus cavity 68. Second annulus cavity 74 is in communication with first annulus cavity 68 via second plurality of passageway 76. Fluid conduit means 78 extends from said second annulus cavity 74 through the outer periphery of the housing 14.

Figure 3:
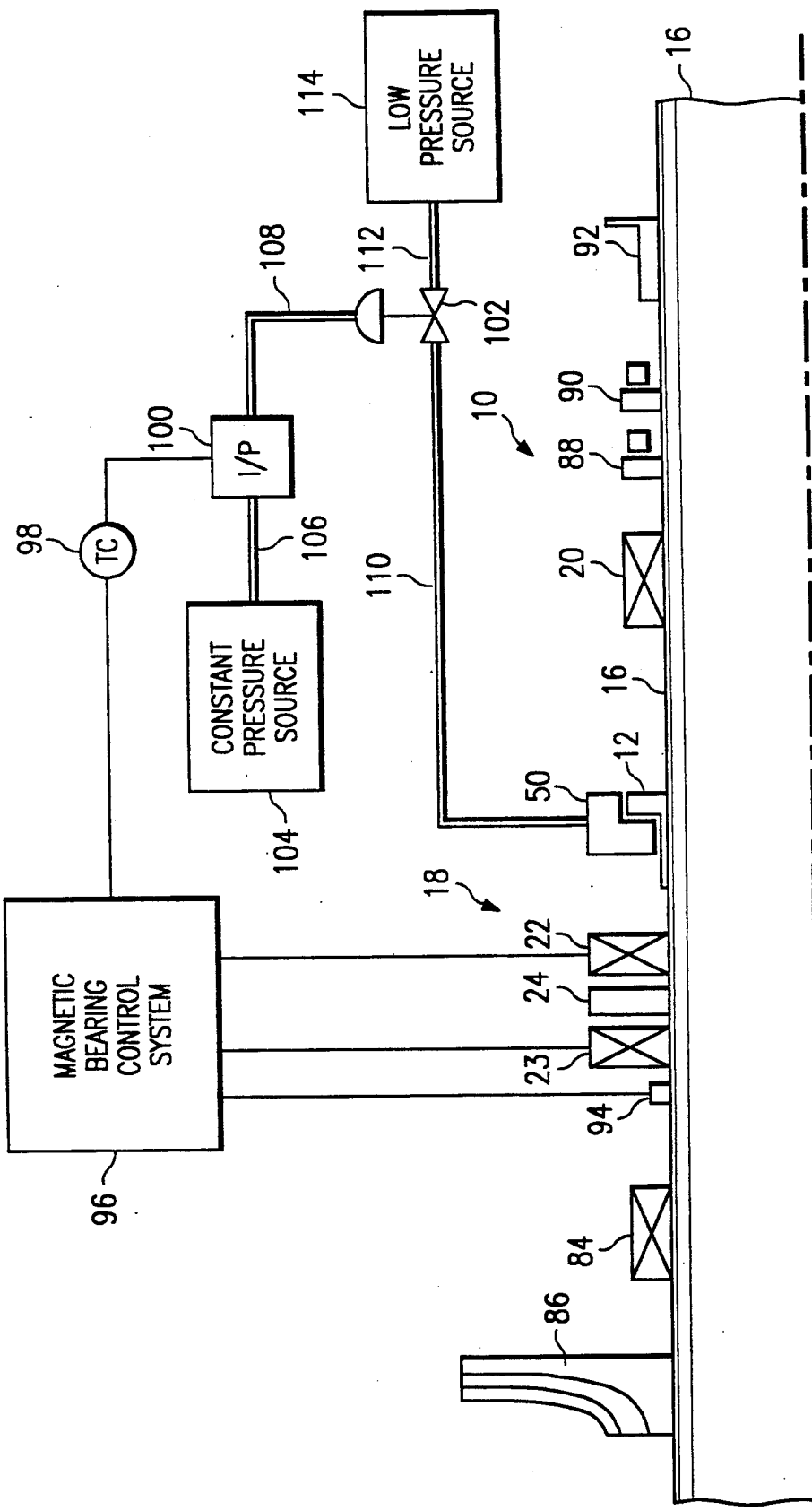
FIG. 3 is a diagrammatic illustration of a turbo machine employing the thrust compensating apparatus of the invention.

With reference to FIG. 3, the electrical current to the outboard stator 22 and the inboard stator 23 of the magnetic axial thrust bearing 18 is supplied and controlled by the magnetic bearing control system 96 in response to the input from sensor or sensors 94 and the axial or shaft position reference signal generated in the magnetic bearing control system 96. The high pressure gas introduced to turbo machine 10 provides a force which tends to move shaft 16 in a direction from the end upon which impeller 86 is mounted toward the end upon which coupler 92 is mounted (from left to right in FIG. 3). Sensor 94 detects this movement and provides an indication thereof to the magnetic bearing control system 96 which increases the magnitude of thrust current sent to the coils of outboard stator 22 to provide a force against rotor or disk 24 to counteract the force provided by the high pressure gas and maintain shaft 16 in the desired position axially.

Because of the limited thrust capacity of the magnetic axial thrust bearing 18, the present invention provides additional thrust force on shaft 16 to counteract all or a portion of the thrust force generated by the high pressure gas introduced to the turbo machine 10.

Thrust controller 98, which in the preferred embodiment is a proportional, integral controller, is operatively connected to the magnetic bearing control system 96 to also receive the thrust current sent to outboard stator 22 or a value proportional thereto. The output of thrust controller 98 is transmitted to a current-to-pressure transducer 100 which also receives an input of constant pressure air from constant pressure air source 104 via conduit 106. The air pressure out of the current-to-pressure transducer 100 is sent via conduit 108 to control the position of throttle valve 102 which is positioned between conduits 110 and 112. Conduit 110 is connected between fluid conduit means 78 and throttle valve 102 while conduit 112 is connected between throttle value 102 and a low pressure air source With further reference to FIGURES 1 and 3, in operation of the turbo machine 10, the thrust force on shaft 16 is in a direction toward coupler 92. Sensor 94 provides a signal to the magnetic bearing control system 96 indicating the movement of shaft 16 toward the end with coupler 92. The magnetic bearing control system 96 sends thrust current to the coils of outboard stator 22 to provide a force in opposition to the sensed thrust force on shaft 16. The greater the sensed movement of shaft 16, the greater the thrust current. Magnetic bearing control system 96 also sends this same value of thrust current, or a value proportional thereto, to thrust controller 98. The output of thrust controller 98 to the current-to-pressure transducer 100 is of a value proportional to the received input. The greater the value of current received from the thrust controller 98, the greater the pressure applied to throttle value 102 with a resulting greater thrust unloading vent flow from first annulus cavity 6 through the second plurality of passageway 76, fluid conduit means 78, conduit 110, throttle value 102 and conduit 112 to low pressure source 114.

With the venting of first annulus cavity 68, the pressure within first annulus cavity 68 will be lowered to a value dependent upon the amount of opening of throttle valve 102 and the amount of time the throttle valve 102 is in the open position. With the pressure within the first annulus cavity 68 being less than the pressure in cavity 15 exerted by the high pressure gas contained therein, the resultant force on first radially oriented face 48 will move thrust compensating member 12 and shaft 16 in a direction toward impeller 86. It will be appreciated that this closed loop control system will regulate the amount of thrust compensation applied to shaft 16 by throttling conduit or vent line 110. When the value of thrust current to the coils of outboard stator 22 falls below a predetermined threshold value, the throttle or vent valve will be closed and turbo machine 10 will operate without any thrust compensation by the thrust compensating apparatus 11.

Although the present invention has been described with reference to a presently preferred embodiment, it will be appreciated by those skilled in the art that various modifications, alternatives, variations, etc., may be made without departing from the spirit and scope of the invention as defined in the appended claims.

We claim:

1. Thrust compensating apparatus for turbo machinery that includes a housing, a rotor shaft, a cavity in the housing encircling the rotor shaft, means for applying fluid pressure in the cavity, bearings in the housing rotatably supporting the rotor shaft and including a magnetic axial thrust bearing and sensor operatively connected to a control system, said thrust compensating apparatus comprising:

an annular thrust compensating member including a bore by which said annular thrust compensating member is removably mounted to the rotor shaft and a first radially oriented face subjected to the fluid pressure in the cavity in the housing;

an annular seal located in the housing and including a seal body having a first end and a second end subjected to the fluid pressure in the cavity in the housing, a first plurality of passageways extending through said first end and said second end to equalize the pressure on said ends, a first radially-projecting annular flange for rotatingly and sealingly receiving said annular thrust compensating member and a second radially-projecting annular flange for rotatingly and sealingly receiving said annular thrust compensating member, said first radially-projecting annular flange and said second radially-projecting annular flange being separated axially a predetermined distance;

a first annulus cavity formed by said first radially-projecting annular flange, said second radially-projecting annular flange and said annular thrust compensating member; and vent means for controlling the fluid pressure in said first annulus cavity thereby controlling the resulting thrust force applied to said first radially oriented face.

2. The apparatus of claim 1 wherein said vent means comprises:

a second annulus cavity formed in the housing and juxtaposed with respect to said annular seal;

a second plurality of passageways extending between said first annulus cavity and said second annulus cavity;

fluid conduit means extending from said second annulus cavity through the outer periphery of the housing; and a valve connected between said fluid conduit means and a low pressure source.

3. The apparatus of claim 2 further including means for controlling said vent means.

4. The apparatus of claim 3 wherein said means for controlling said vent means comprises:

a source of air;

a current-to-pressure transducer operatively connected between said source of air and said valve; and a controller operatively connected between the control system for the magnetic axial bearing and said current-to-pressure transducer.

5. The apparatus of claim 4 wherein said means for controlling said vent means further comprises:

sensor means to sense axial movement of said rotor shaft from a desired axial location and provide an output signal to the control system for the magnetic axial bearing which is indicative of the magnitude of the sensed axial movement.

6. The apparatus of claim 1 wherein said annular seal comprises a labyrinth seal.

7. The apparatus of claim 1 wherein said annular thrust compensating member includes a first portion received by said first radially-projecting annular flange and a second portion received by said second radially-projecting annular flange, said first portion being formed with a diameter smaller in value than the diameter of said second portion.

8. Thrust compensating apparatus for turbo machinery that includes a housing, a rotor shaft, a cavity in the housing encircling the rotor shaft, means for applying fluid pressure in the cavity, bearings in the housing rotatably supporting the rotor shaft and including a magnetic axial thrust bearing and sensor operatively connected to a control system, said thrust compensating apparatus comprising:

an annular thrust compensating member including a bore by which said compensating member is removably mounted to the rotor shaft, a first portion and a second portion, said second portion including a first radially oriented face subjected to the fluid pressure in the cavity in the housing;

an annular seal located in the housing and including a seal body having a first end and a second end subjected to the fluid pressure in the cavity in the housing, a first plurality of passageways extending through said first end and said second end to equalize the pressure on said ends, a first radially-projecting annular flange for rotatingly and sealingly receiving said first portion of said annular thrust compensating member and a second radially-projecting annular flange for rotatingly and sealingly receiving said second portion of said annular thrust compensating member, said first radially-projecting annular flange and said second radially-projecting annular flange being separated axially a predetermined distance;

a first annulus cavity formed by said first radially-projecting annular flange, said second radially-projecting annular flange, said first portion of said annular thrust compensating member and said second portion of said annular thrust compensating member; and vent means for controlling the fluid pressure in said first annulus cavity thereby controlling the resulting thrust force applied to said first radially oriented face.

9. The apparatus of claim 8 wherein said vent means comprises:

a second annulus cavity formed in the housing and juxtaposed with respect to said annular seal;

a second plurality of passageways extending between said first annulus cavity and said second annulus cavity;

fluid conduit means extending from said second annulus cavity through the outer periphery of the housing; and a valve connected between said fluid conduit means and a low pressure source.

10. The apparatus of claim 9 further including means for controlling said vent means.

11. The apparatus of claim 10 wherein said means for controlling said vent means comprises:

a source of air;

a current-to-pressure transducer operatively connected between said source of air and said valve; and a controller connected between the control system for the magnetic axial bearing and said current-to-pressure transducer.

12. The apparatus of claim 11 wherein said means for controlling said vent means further comprises:

sensor means to sense axial movement of said rotor shaft from a desired axial location and provide an output signal to the control system for the magnetic axial bearing which is indicative of the magnitude of the sensed axial movement.

13. The apparatus of claim 7 wherein said annular seal comprises a labyrinth seal.

* * * * *